United States Patent
Wehner et al.

(10) Patent No.: US 6,791,471 B2
(45) Date of Patent: Sep. 14, 2004

(54) COMMUNICATING POSITION INFORMATION BETWEEN VEHICLES

(75) Inventors: Lawrence C. Wehner, Lake Orion, MI (US); Mary K. DePrez, New Castle, IN (US); Michael A. Crowder, Washington, MI (US)

(73) Assignee: Electric Data Systems, Plano, TX (US)

( * ) Notice: Subject to any disclaimer, the term of this patent is extended or adjusted under 35 U.S.C. 154(b) by 78 days.

(21) Appl. No.: 10/260,528

(22) Filed: Oct. 1, 2002

(65) Prior Publication Data

US 2004/0061600 A1 Apr. 1, 2004

(51) Int. Cl.[7] .................................................. G08G 1/16
(52) U.S. Cl. .................. 340/903; 340/988; 340/438; 701/301
(58) Field of Search ................................. 340/903, 904, 340/988, 426.16, 438, 441, 435, 436; 701/301

(56) References Cited

U.S. PATENT DOCUMENTS

| | | | | |
|---|---|---|---|---|
| 4,177,466 A | * | 12/1979 | Reagan | 342/456 |
| 4,741,409 A | * | 5/1988 | Westercamp et al. | 180/413 |
| 4,818,998 A | * | 4/1989 | Apsell et al. | 342/444 |
| 4,908,629 A | * | 3/1990 | Apsell et al. | 342/457 |
| 5,504,482 A | * | 4/1996 | Schreder | 340/995.13 |
| 5,546,311 A | * | 8/1996 | Sekine | 701/208 |
| 5,625,558 A | * | 4/1997 | Togai et al. | 701/93 |
| 5,833,025 A | * | 11/1998 | Bhandari | 180/178 |
| 5,872,526 A | * | 2/1999 | Tognazzini | 340/961 |
| 5,982,281 A | * | 11/1999 | Layson, Jr. | 340/539.13 |
| 5,983,161 A | * | 11/1999 | Lemelson et al. | 701/301 |
| 6,030,316 A | * | 2/2000 | Kadota | 477/121 |
| 6,232,884 B1 | * | 5/2001 | Gabbard | 340/825.72 |
| 6,275,773 B1 | * | 8/2001 | Lemelson et al. | 701/301 |
| 6,314,366 B1 | * | 11/2001 | Farmakis et al. | 701/201 |
| 6,345,681 B1 | * | 2/2002 | Hackl et al. | 180/402 |
| 6,370,475 B1 | | 4/2002 | Breed et al. | 701/301 |
| 6,392,531 B1 | * | 5/2002 | Gabbard | 340/5.31 |
| 6,393,362 B1 | * | 5/2002 | Burns | 701/301 |
| 6,411,217 B1 | * | 6/2002 | Gabbard | 340/5.1 |
| 6,411,882 B1 | * | 6/2002 | Bidner et al. | 701/93 |
| 6,429,773 B1 | * | 8/2002 | Schuyler | 340/425.5 |
| 6,442,484 B1 | * | 8/2002 | Miller et al. | 701/301 |
| 6,445,308 B1 | * | 9/2002 | Koike | 340/902 |
| 6,609,057 B2 | * | 8/2003 | Miller et al. | 701/96 |
| 2001/0044697 A1 | | 11/2001 | Kageyama | 701/301 |
| 2002/0017415 A1 | | 2/2002 | Campbell et al. | 180/271 |
| 2002/0198660 A1 | | 12/2002 | Lutter et al. | 701/301 |

* cited by examiner

Primary Examiner—Toan N. Pham
(74) Attorney, Agent, or Firm—Fish & Richardson P.C.

(57) ABSTRACT

Wireless communication between vehicles may permit position information about one vehicle to be communicated directly to another vehicle. Such an information exchange between vehicles may increase the awareness of an operator of a vehicle to other vehicles in the surrounding environment and may help a vehicle operator operate the vehicle more safely. Vehicles may share through the use of wireless communications position, direction, speed, or other information, such as the deployment of safety devices or the presence of particular types of vehicles (e.g., an emergency vehicle or school bus). The vehicle that receives a wireless communication compares the position, direction, and speed of incoming information from another vehicle to the vehicle's own speed, direction, and position to determine whether action is required. The action taken by the vehicle may include providing general or specific warnings to the operator of the vehicle or, in some cases, taking direct action, such as turning off cruise control, applying brakes, or deploying traction control.

29 Claims, 5 Drawing Sheets

COMMUNICATING POSITION INFORMATION BETWEEN VEHICLES

TECHNICAL FIELD

This description relates to techniques for using wireless networks to communicate vehicle position and status information between vehicles.

BACKGROUND

Vehicle collisions may be caused by unanticipated lane changes, unsafe following distances between vehicles for a given driving speed, or operator inattentiveness, distraction, or impaired view. Other types of accidents may be caused by operator unawareness of a situation, such as a school bus loading or unloading school children, a fast-approaching emergency vehicle, or slippery road conditions.

One approach to improving vehicle safety may be to create a buffer zone around a vehicle and to warn the vehicle operator when another vehicle is within the buffer zone. The buffer zone may be referred to as a cocoon. The buffer zone may be created using cameras, radar, or other detection devices of the vehicle to determine whether a vehicle or other object is in the buffer zone. Information about the relative placement of other vehicles to a particular vehicle also may be determined using a global positioning system to detect the location of vehicles. Vehicle position information obtained from a global positioning system may be provided to a central computer system that may warn a vehicle operator of a hazardous situation.

SUMMARY

In one general aspect, communicating position information between vehicles includes using a wireless communication pathway to broadcast a message from a first vehicle. The message describes a position of the first vehicle, a speed of the first vehicle, and a direction in which the first vehicle is traveling. The message is received at a second vehicle. A determination is made as to a position of the second vehicle, a speed of the second vehicle, and a direction in which the second vehicle is traveling. The position of the first vehicle, the speed of the first vehicle, and the direction in which the first vehicle is traveling are compared with the position of the second vehicle, the speed of the second vehicle, and the direction in which the second vehicle is traveling to determine whether an action is required by the second vehicle.

Implementations may include one or more of the following features. For example, a message may include status information of the first vehicle. A determination may be made as to the status of the second vehicle. The position, speed, direction, and status information of the first vehicle may be compared with the position, speed, direction, and status information of the second vehicle to determine whether an action is required by the second vehicle.

When an action is required, one or more warnings to the operator of the second vehicle may be generated. One or more components of the second vehicle may be controlled when an action is required. For example, a cruise control system, a braking system, or a throttle may be controlled. User selection of components of the second vehicle that are controlled when an action is required may be permitted. An audible warning, a visual warning or a haptic warning may be generated.

A significant change in the position of the first vehicle, speed, direction or status of the first vehicle may be detected.

The message from the first vehicle may be broadcast only when a significant change is detected in one or more of the position, speed, direction, or status of the first vehicle. The status may indicate one or more of a deployment of one or more of an airbag, an application of traction control, lack of movement, an abrupt change of direction, rapid acceleration, rapid deceleration, an approaching emergency vehicle, or the loading/unloading of school children.

In another general aspect, a vehicle processes position information received from other vehicles. The vehicle includes a processor connected to a storage device and connected to one or more input/output devices. The processor is configured to receive from a second vehicle a message sent using a wireless communication pathway. The message describes a position of the second vehicle, a speed of the second vehicle, and a direction in which the second vehicle is traveling. The processor is configured to determine a position of the vehicle, a speed of the vehicle, and a direction in which the vehicle is traveling. The processor is configured to compare the position, speed, and direction of the vehicle with the position, speed, and direction of the second vehicle to determine whether an action is required by the vehicle.

Implementations may include one or more of the following features. For example, the received message may include status information about the second vehicle. The processor may be able to determine status information about the vehicle. The processor may compare the position, speed, direction, and status of the vehicle with the position, speed, direction, and status of the second vehicle to determine whether an action is required by the vehicle.

The processor may generate one or more warnings to the operator of the vehicle when an action is required. The processor may control one or more components of the vehicle when an action is required. For example, the processor may be configured to control one or more of a cruise control system, a braking system, or a throttle. The processor also may permit user selection of components of the vehicle that are controlled when an action is required. The processor may be configured to generate one or more of an audible warning, a visual warning or a haptic warning.

The vehicle may be, for example, an automobile, a bus, a truck, or a train. Warnings may be generated using, for example, one or more of a sound system speaker, a dashboard light, a display screen or a haptic control for a steering wheel which is capable of vibrating the steering wheel. Wireless communication between vehicles may permit position information about one vehicle to be communicated directly to another vehicle. Such an information exchange between vehicles may increase the awareness of an operator of a vehicle to other vehicles in the surrounding environment and may help a vehicle operator operate the vehicle more safely.

Implementations of the techniques discussed above may include a method or process, a system or apparatus, or computer software on a computer-accessible medium.

The details of one or more of the implementations are set forth in the accompanying drawings and description below. Other features will be apparent from the description and drawings, and from the claims.

DESCRIPTION OF DRAWINGS

Like reference symbols in the various drawings indicate like elements.

DETAILED DESCRIPTION

The described techniques use wireless communications between vehicles to share position, direction, speed, or other status information, such as the deployment of safety devices (e.g. an airbag or an anti-lock braking system) or the presence of particular types of vehicles (e.g., an emergency vehicle or a school bus). Vehicles communicate with each other through wireless communication to share important positional information and other types of information. The vehicle that receives a wireless communication compares the position, direction, and speed of incoming information from the other vehicle to the vehicle's own speed, direction, and position to determine whether action is required. When action is required, the action taken by the vehicle may include providing general or specific warnings to the operator of the vehicle or, in some cases, taking direct action, such as turning off cruise control, applying brakes, or deploying traction control.

Figure 1:
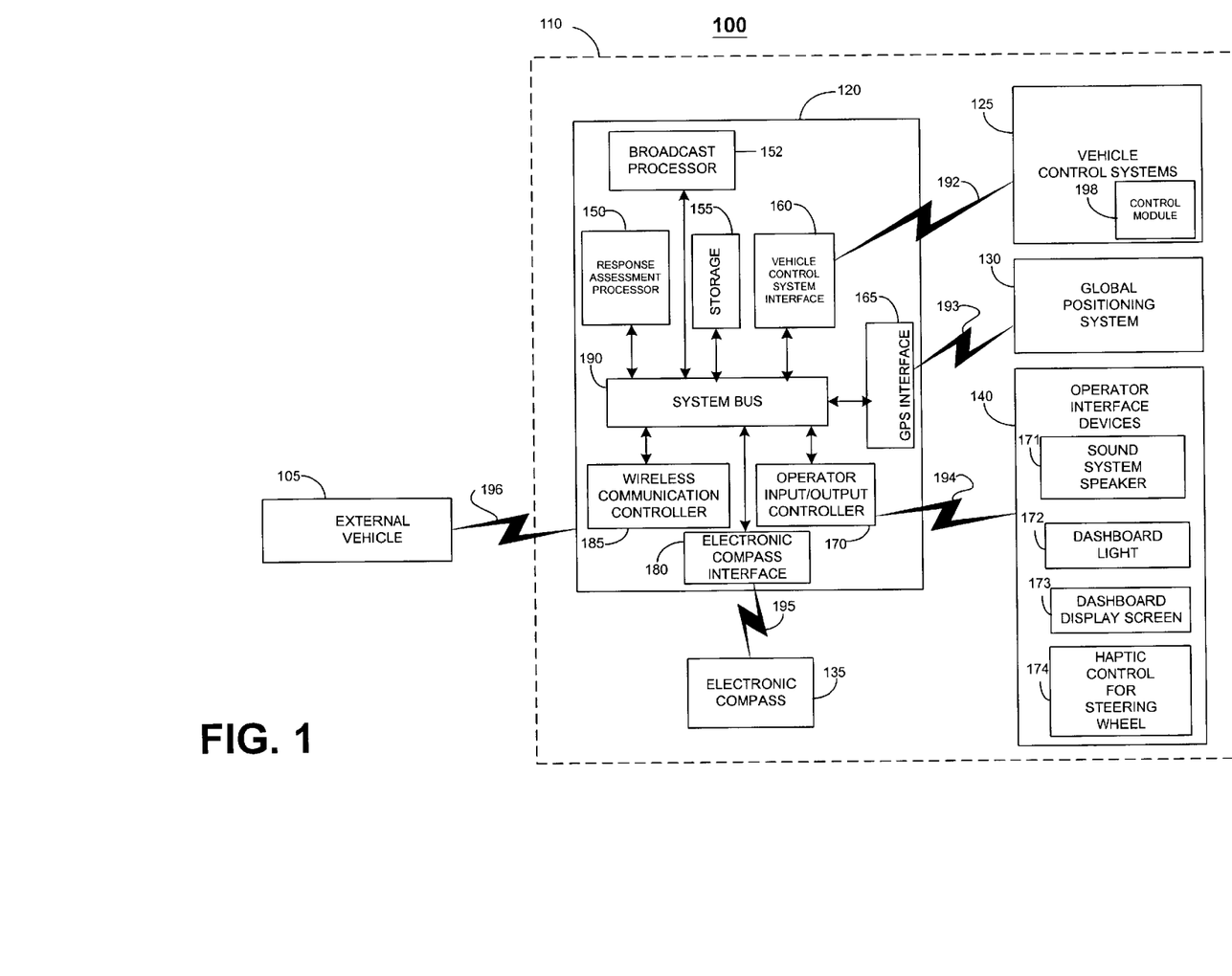
FIG. 1 is a block diagram of a system for wireless communication between vehicles.

Referring to FIG. 1, a system 100 is capable of delivering and exchanging wireless messages between two vehicles 105 and 110. Vehicle 110 includes a positional wireless communication system 120, vehicle control systems 125, a global positioning system 130, an electronic compass 135, and operator interface devices 140.

The positional wireless communication system 120 includes a response assessment processor 150, a broadcast processor 152, a storage unit 155, a vehicle control systems interface 160, a global positioning systems (GPS) interface 165, an operator input/output controller 170, an electronic compass interface 180, a wireless communication controller 185, and a system bus 190. The response assessment processor 150 and a broadcast processor 152 are central processing units (CPUs) that process executable instructions. The storage unit 155 stores executable instructions and data.

The vehicle control systems interface 160 is capable of exchanging messages with vehicle control systems 125 through communication pathway 192. The GPS interface 165 is capable of exchanging messages with global positioning system 130 through communications pathway 193. Operator input/output controller 170 is capable of sending and receiving communications with a variety of input/output devices 140 through communications pathway 194. The input/output devices 140 may include a sound system speaker 171, a dashboard light 172, a dashboard display screen 173, and a haptic control for a steering wheel 174. The sound system speaker 171 may be a general sound system speaker associated with a multi-purpose sound system in the vehicle that plays audio from a radio, CD, or DVD entertainment system. The sound system speaker 171 also may be a specific sound system speaker associated with the positional wireless communication system 120. The dashboard light 172 may be a light capable of emitting a flashing light. The dashboard display screen 173 may display a text message or another type of message. The haptic control for the steering wheel 174 may vibrate the steering wheel.

The electronic compass interface 180 is capable of exchanging information with electronic compass 135 through communication pathway 195. The wireless communication controller 185 is capable of sending and receiving wireless communications from external vehicles 105 through wireless communications pathway 196.

The system bus 190 provides a series of parallel connections to allow communication between the response assessment processor 150, the broadcast processor 152, the storage unit 155, the vehicle control system interface 160, the GPS interface 165, the operator input/output controller 170, the electronic compass interface 180, and the wireless communication controller 185.

The vehicle control systems 125 may include one or more control modules 198 for vehicle 110. A control module 198 may be a central computer for the vehicle 110. The control module 198 may control one or more vehicle components, such as the position of the throttle, the traction control system, or the braking system. The control module 198 may be able to detect the speed that the vehicle is traveling using, for example, the position of the throttle or data from the speedometer.

The global positioning system 130 is capable of determining the location of the vehicle, such as the longitude and latitude of the vehicle. The electronic compass 135 is capable of determining the direction in which the vehicle is traveling.

Communications pathways 192, 193, 194 or 195 may use wireless or wired technology. Communications pathway 196 is a wireless communications pathway that may be analog or digital. For example, the wireless communications pathway 196 may use wireless technology based on the Bluetooth standard for short range wireless communications. The wireless communication pathway 196 also may use wireless technology based on other personal area network (PAN) technologies, the Institute of Electrical and Electronics Engineers, Inc. (IEEE) 802.11 standard (such as 802.11b or 802.11a), or other wireless technology such as the Hiper-Lan2 standard by the European Telecommunications Standards Institute (ETSI). The wireless communications pathway 196 also may be based on other analog or digital wireless technology, such as the wireless technology used in cordless phones. Wireless technology used in cordless telephones, for example, may use the 43 to 50 megahertz (MHz) band, the 900 MHz band, the 2.5 gigahertz (GHz) band, or another band of the radio spectrum. Some types of wireless technologies may provide a benefit over other types of wireless technology. For example, the use of cordless telephone wireless technology may be beneficial because the broadcast range is smaller when compared with other wireless technologies. A smaller broadcast range may result in the receipt of fewer vehicle-to-vehicle messages. The radio spectrum used by the cordless telephone wireless technology, however, may be generally more crowded than areas of the spectrum used by other wireless technology. The use of wireless technology other than wireless technology used for cordless telephones may result in the receipt of fewer wireless messages that are not related to positional vehicle information.

The wireless communication controller 185 receives a wireless communication message from the external vehicle 105 through the wireless communications pathway 196. The wireless communication controller 185 sends the wireless communication message to the response assessment processor 150 using the system bus 190.

The response assessment processor 150 receives messages from the vehicle control systems 125, the global positioning system 130, and the electronic compass 135 and uses those messages to determine the speed, position, direction, and control information about the vehicle 110. For example, a message sent from the vehicle control system 125 through communications pathway 192 is received by the vehicle control system interface 160. The message may include speed information or other control information, such as the status of the traction control system. The vehicle control system interface 160 sends the message to the response assessment processor 150 using the system bus 190.

Similarly, a message that indicates the location of vehicle 110 is sent from the global positioning system 130 through communications pathway 193 to the GPS interface 165. The GPS interface 165 sends the message to the response assessment processor 150 using the system bus 190. A message that indicates the direction that the vehicle 110 is traveling is sent from the electronic compass 135 through communications pathway 195 to the electronic compass interface 180. The electronic compass interface 180 sends the message to the response assessment processor 150 using the system bus 190.

The response assessment processor 150 compares information about the external vehicle 105 received through the wireless communications pathway 196 with information received from vehicle control systems 125, the global positioning system 130, and/or electronic compass 135 to determine whether action is required. The response assessment processor 150 may determine what action, if any, is needed based on the current or projected relative positions of vehicles 105 and 110. The action taken by the response assessment processor 150 may include a general warning or a specific warning to the operator of the vehicle through the use of one or more of operator interface devices 140. In particular, the response assessment processor may communicate with the operator of the vehicle through an operator interface device 140 by providing a warning, such as a visual warning, an audible warning, or a haptic warning through the sense of touch.

In some cases, the action taken by the response assessment processor 150 also may include controlling a vehicle component. The response assessment processor 150 may send a message to the vehicle control systems 125 through the system bus 190, the vehicle control system interface 160, and communication pathway 192. The message sent by the response assessment processor 150 may include, for example, controlling the vehicle to prepare for a collision by deploying airbags. The message sent by the response assessment processor 150 also may control the vehicle in an attempt to avoid a collision or other type of accident, for example, by applying the braking system, applying the traction control system, or decelerating by controlling the position of the throttle. In some implementations, the operator of the vehicle may have the option to disable all or some direct control actions by the response assessment processor 150.

In one illustrative example, the response assessment processor 150 receives a wireless communication message from external vehicle 105 and determines that vehicle 105 is in the path of vehicle 110. Based on the relative speeds of vehicles 105 and 110, the response assessment processor 150 determines that a collision may occur and issues a specific warning to the operator of vehicle 115 to slow down because of an impending collision. The response assessment processor 150 sends the message through system bus 190 to the operator input/output controller 170. The operator input/output controller 170 sends the message through communication pathway 194 to one or more of operator interface devices 140. The specific warning sent by the response assessment processor 150 may be, for example, an audio warning provided through a speaker of the vehicle's sound system 171, a visual warning of a flashing light on a dashboard light 172, a text message on a dashboard display screen 173, a haptic warning such as the vibration of the steering wheel through haptic control for the steering wheel 174, or a combination of an audio message, a visual message, or a haptic message. When the threat of collision is severe, the response assessment processor 150 also may send one or more messages to the vehicle control systems 125 to take action to avoid the collision or minimize the effects of the collision, for example, by slowing the vehicle by turning off a cruise control function in the vehicle, decelerating, and/or applying brakes.

The vehicle 105 may use wireless communication pathway 196 to send a wireless communication message that provides the vehicle's location, speed, and direction, and a text message or code that indicates that the airbag or other safety system of the vehicle 105 has been applied. The vehicle 110 (as well as other vehicles) may receive the wireless communication message through wireless communication controller 185. The wireless message may be sent to the response assessment processor 150 through the system bus 190. When the response assessment processor 150 determines that the vehicle 105 is in the pathway of the vehicle 110, the response assessment processor 150 may send a general warning to the operator of vehicle 110 to be alert, slow down or otherwise inform the operator of the potential hazard. The response assessment processor 150 may send the message through system bus 190 to the operator input/output controller 170. The operator input/output controller 170 sends the message through communication pathway 194 to one or more of operator interface devices 140.

In some cases, the vehicle 105 may send a wireless communication message that provides the location, speed, and direction of the vehicle 105 when the vehicle 105 is not moving. For example, when the vehicle 105 is stopped in a road, for example, at a traffic signal, waiting to make a left turn, or at a stop sign, the vehicle 105 may broadcast a wireless communication message that indicates the location, speed (e.g., zero when the vehicle is stopped), direction (which may indicate the vehicle is not moving), and a text message or code that indicates that the vehicle is stopped. The vehicle 110 may receive the wireless communication message through wireless communication controller 185. The wireless message may be sent to the response assessment processor 150 through the system bus 190. When the response assessment processor 150 determines that the vehicle 105 is in the pathway of the vehicle 110 and the vehicle is not moving, the response assessment processor 150 may send a general warning to the operator of the vehicle 110 to be alert, slow down or otherwise inform the operator of the potential hazard. The response assessment processor 150 may send the message through system bus 190 to the operator input/output controller 170. The operator input/output controller 170 sends the message through communication pathway 194 to one or more of operator interface devices 140. A more specific warning to stop may be provided to the operator of the vehicle 110 when the risk of collision is higher.

Vehicles may communicate with each other through wireless communication technology to share important information such as, but not limited to, a significant change in speed, a rapid change in direction (particular at a high speed), the application of a braking system, the deployment of one or more airbags, the application of a traction control system, the approach of an emergency vehicle, or a school bus unloading or loading school children.

For example, when vehicle 105 is directly ahead of vehicle 110 and the vehicle 105 hits ice in the road, begins to skid, and applies traction control, the vehicle 105 may send a wireless message that provides the vehicle's location, speed, and direction, and a text message or code that indicates that the traction control of vehicle 105 has been applied. Vehicle 110 receives the wireless communication message and may warn the driver to slow down or may, in some cases, apply the traction control system of vehicle 110. The response assessment processor 150 may send the message through system bus 190 to the operator input/output controller 170. The operator input/output controller 170 sends the message through communication pathway 194 to one or more of operator interface devices 140.

An emergency vehicle may be equipped with a wireless communications system that broadcasts the position, direction, and speed of the emergency vehicle and identifies the vehicle as an emergency vehicle. Such information may be received by the wireless communication systems of other vehicles on the road so that their respective operators may be warned of the approach of an oncoming emergency vehicle. Such a warning may be particularly beneficial in an urban environment where it may be difficult for an operator of a vehicle to determine the approach of an emergency vehicle.

Similarly, a school bus may be equipped with a wireless communications system that broadcasts the position, direction, and speed of the school bus and indicates that the vehicle is loading and/or unloading school children. Such information may be received by the wireless communication systems of other vehicles on the road so that their respective operators may be warned of that the school bus is loading or unloading school children.

The broadcast processor 152 monitors the vehicle 110, for example, by receiving messages from the vehicle control systems 125, the global positioning system 130, and the electronic compass 135 to determine position, speed, and traveling direction of the vehicle 110. The broadcast processor 152 also may monitor the status of vehicle systems, such as whether an airbag has been deployed or a traction control system has been deployed. When the broadcast processor 152 detects a significant change, the broadcast processor may send a message to the wireless communication controller 185. The wireless communication controller 185 then broadcasts the message through wireless communication pathway 196 to vehicle 105 and other nearby vehicles.

In some implementations, the functions performed by the response assessment processor 150 and the broadcast processor 152 may be performed by a single processor. Alternatively, the functions performed by the response assessment processor 150 and the broadcast processor 152 may be performed by more than two processors.

Figure 2:
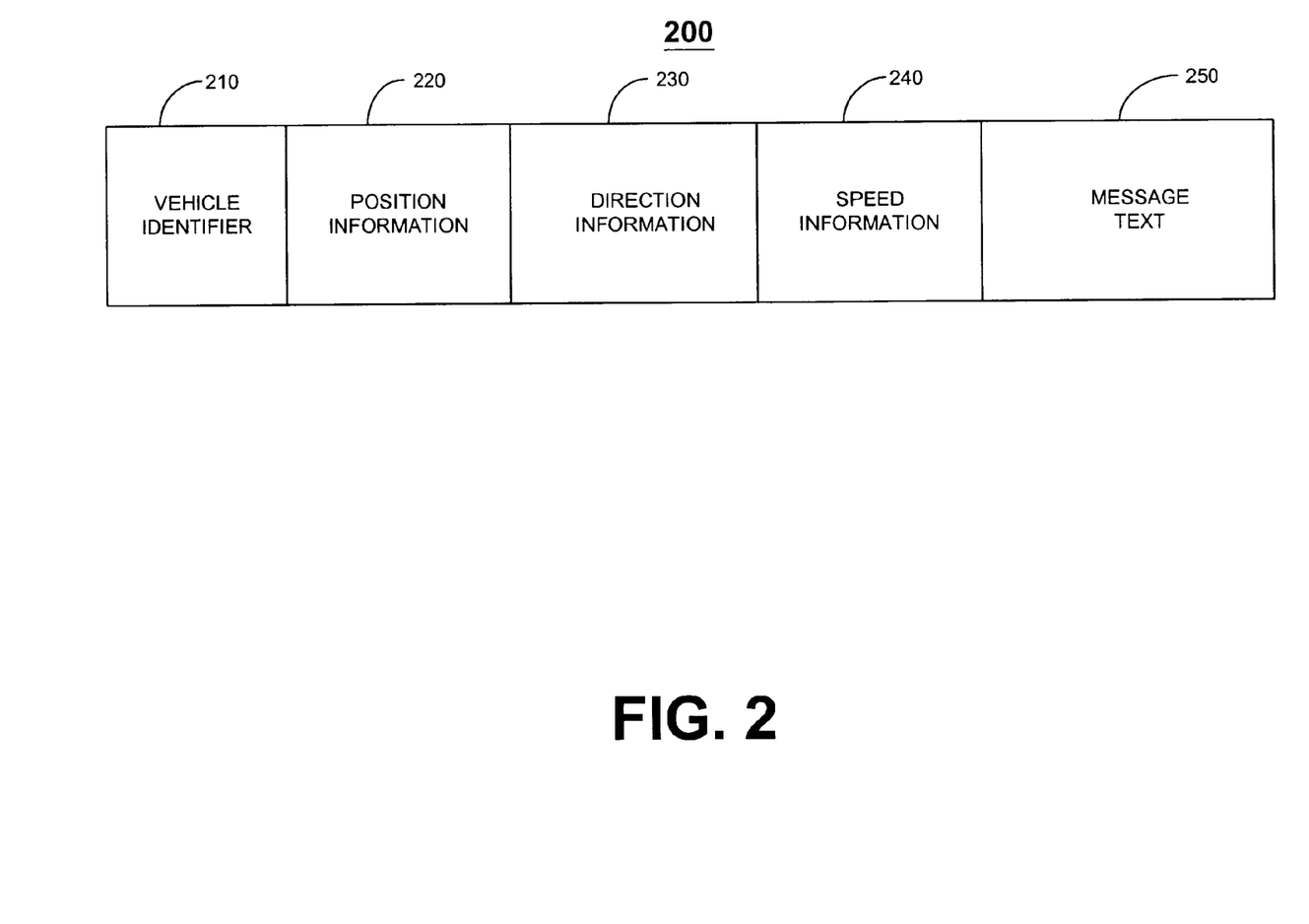
FIG. 2 is a block diagram illustrating a data structure for a wireless communication message exchanged between vehicles.

FIG. 2 is an example of a data structure 200 for positional wireless communication messages that are exchanged between vehicles. The data structure 200 includes vehicle identifier 210, position information 220, direction information 230, speed information 240, and a message text 250. The vehicle identifier 210 uniquely identifies the vehicle sending the message. The vehicle identifier 210 may be the Vehicle Identification Number that is generally recognized as a vehicle identifier for regulatory purposes. The vehicle identifier 210 also may be another type of identifier that uniquely identifies the vehicle. In some implementations, the vehicle identifier 210 is not used.

Position information 220 reflects the position, such as the longitude and latitude, of the vehicle at the time in which the message was sent. Position information 220 may be obtained, for example, from a global positioning system that corresponds generally to global positioning system 130 of FIG. 1.

Direction information 230 includes the direction in which the vehicle that is sending the message is traveling. The direction may be descriptive, such as a north, south, east, west, northeast, southeast, northwest, or southwest, or may be a pair of longitude and latitude coordinates. The direction information may be based on information received from an electronic compass that corresponds generally to electronic compass 135 of FIG. 1.

Speed information 240 indicates the speed at which the vehicle that sent the message is traveling at the time the message was sent. Speed information 240 may be a speed in miles per hour, kilometers per hour, or some other value. Speed information 240 may be obtained from an acceleration control system, another vehicle control system, a sensor that detects the position of the vehicle throttle, or the speedometer of the vehicle.

Message text 250 includes any text or a code that may be associated with the message. For example, message text 250 may indicate that an emergency vehicle is approaching, a school bus is loading or unloading school children, an airbag has been deployed, a traction control system has been applied, or a vehicle is stopped in a roadway. When message text 250 includes a code, the code may be translated by a list or table that associates a message text with a particular code.

Figure 3:
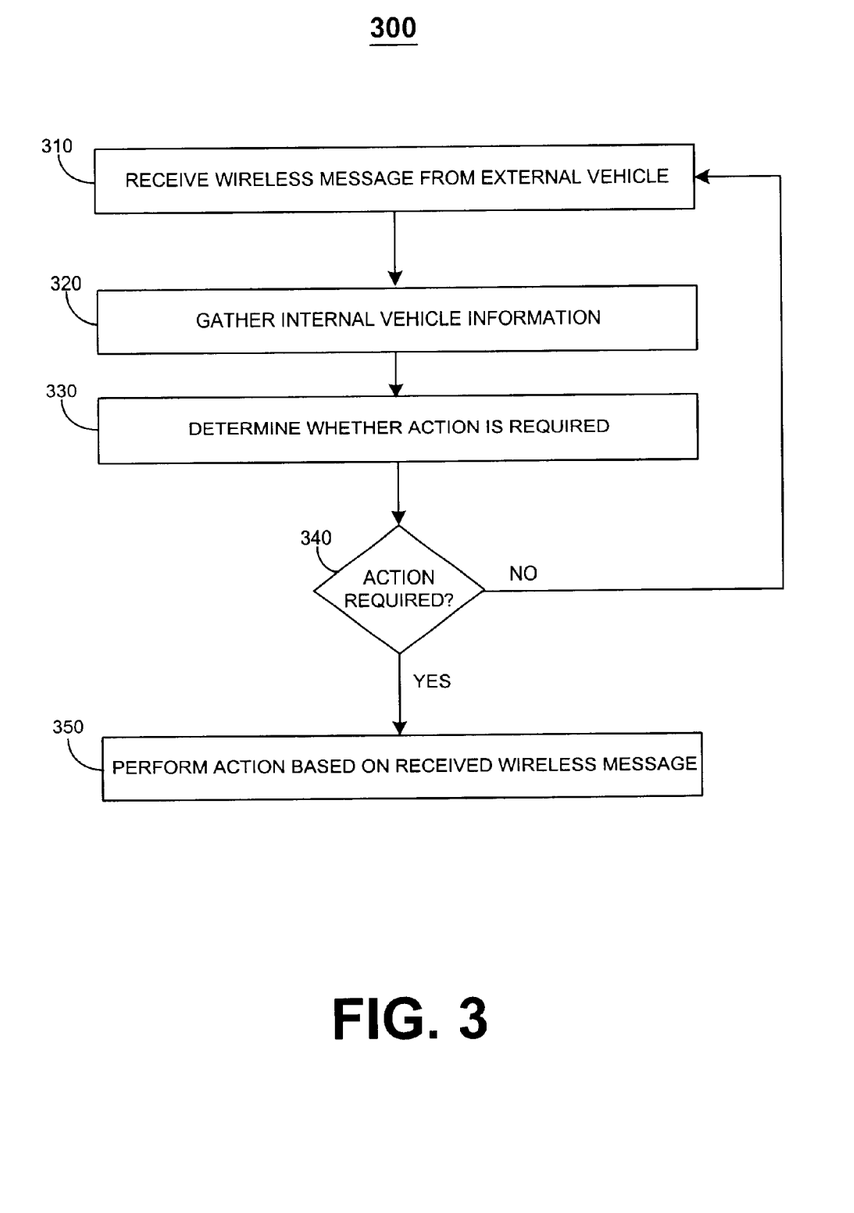
FIG. 3 is a flow chart of a process for determining what action, if any, is required based on a wireless communication message received from another vehicle.

FIG. 3 illustrates a process for determining what action, if any, may be required based on a wireless message received from another vehicle. The process 300 may be implemented, for example, by response assessment processor 150 of FIG. 1. The process 300 begins when a processor receives a wireless message from an external vehicle (step 310). The external vehicle is equipped with a positional wireless communications system and may be capable of broadcasting information messages to surrounding vehicles, for example, in the 100 to 1000 foot range around the vehicle.

The processor then gathers internal vehicle information (step 320). The gathered vehicle information may include, for example, location information that may be gathered by a vehicle global positioning system that generally corresponds to the global positioning system 130 of FIG. 1. The gathered information also may include direction information that may be gathered from an electronic compass that generally corresponds to electronic compass 130 of FIG. 1, or speed information about the vehicle that may be gathered from a vehicle control system that generally corresponds to a vehicle control system 125 of FIG. 1. In some implementations, speed information about the vehicle may be determined based on two or more readings of the vehicle location and the time at which each location was determined. The speed of the vehicle may be calculated based on the distance traveled in the time between the location readings. In some implementations, location, direction, and speed information may be provided constantly to the response assessment processor or other processor of FIG. 3 so that step 320 is performed implicitly.

The processor then determines whether action is required (step 330). The processor may determine whether action is required based on the current and projected relative locations of the external vehicle and its own vehicle. For example, the processor may determine whether the external vehicle is in the projected path of its own vehicle. If so, the processor determine whether there is a danger of collision based on the position, speed, and travel direction of the two vehicles. When there is a danger of collision, the processor may determine that action is required. When there is no danger of collision, the processor may determine that no action is required.

When the processor determines that no action is required (step 340), the processor waits to receive another wireless message (step 310) and proceeds as described above.

When the processor determines that action is required (step 340), the processor performs actions based on the information received in the wireless message (step 350). The processor also may determine the importance of the action required based on the communication received from the external vehicle relative to its own internal vehicle information. The actions that may be taken by the processor include providing a warning to the operator of the vehicle and, in some cases, exercising direct control of a particular vehicle function. The warning provided may be a general warning or a warning specific to the detected circumstance.

The type of warning provided may be visual, audible, haptic, or a combination. Examples of warnings include a flashing light, a chime or bell, a message displayed on a display screen on the dashboard, a verbal warning, or the vibration of the steering wheel. When vehicle control systems may be controlled directly by the processor, the processor may send a message to take action on a vehicle control system. Such control action may include taking action to avoid a problem such as turning off the cruise control, decelerating, and applying brakes. Control action by the processor also may include one or more actions to prepare for an imminent collision or other type of accident, such as deploying one or more airbags or applying a traction control system. In some cases, drivers may have the option to disable all or some control actions.

Figure 4:
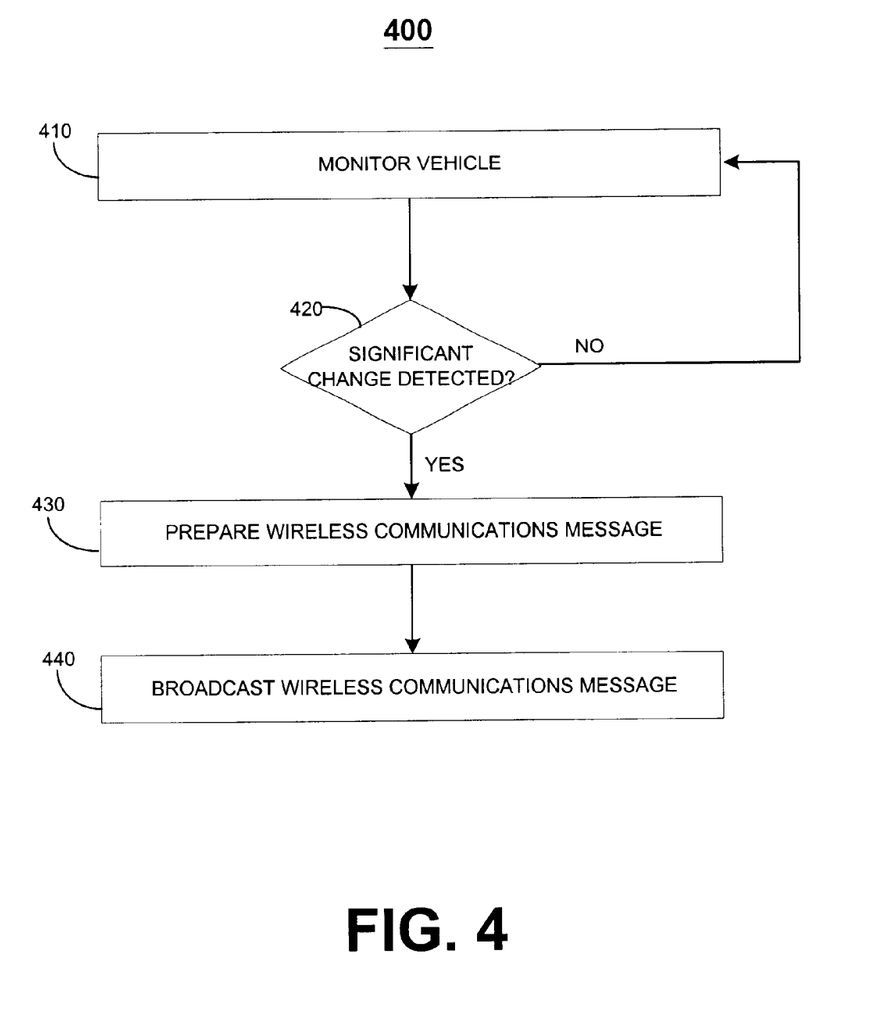
FIG. 4 is a flow chart of a process for generating a wireless communication message.

FIG. 4 illustrates a process to generate a wireless message that communicates vehicle position information. The process 400 may be performed by a processor, such as broadcast processor 152 of FIG. 1. The processor monitors the vehicle by, for example, monitoring the vehicle location, direction, and speed (step 410). The broadcast processor also may monitor the status of vehicle systems, such as whether an airbag has been deployed or a traction control system has been applied.

When the broadcast processor determines that a significant change has been detected (step 420), the broadcast processor prepares a wireless communication message to be broadcast through a wireless communications system to external vehicles (step 430). The wireless message may include, for example, information such as position information, direction information, speed information, a vehicle identifier, or other important text information such as the deployment of an airbag, the deployment of traction control systems or the detection of an emergency vehicle in the area. The information in the wireless communication message may be, for example, position information 220, direction information 230, speed information 240 in data structure 200 of FIG. 200. Some implementations also may include vehicle identification information, such as vehicle identifier 210 of FIG. 2, and a message text, such as message text 250 of FIG. 2.

The prepared wireless communication message is broadcast (step 440). The wireless message may be broadcast, for example, over a wireless communication pathway that corresponds generally to wireless communication pathway 196 of FIG. 1.

Figure 5:
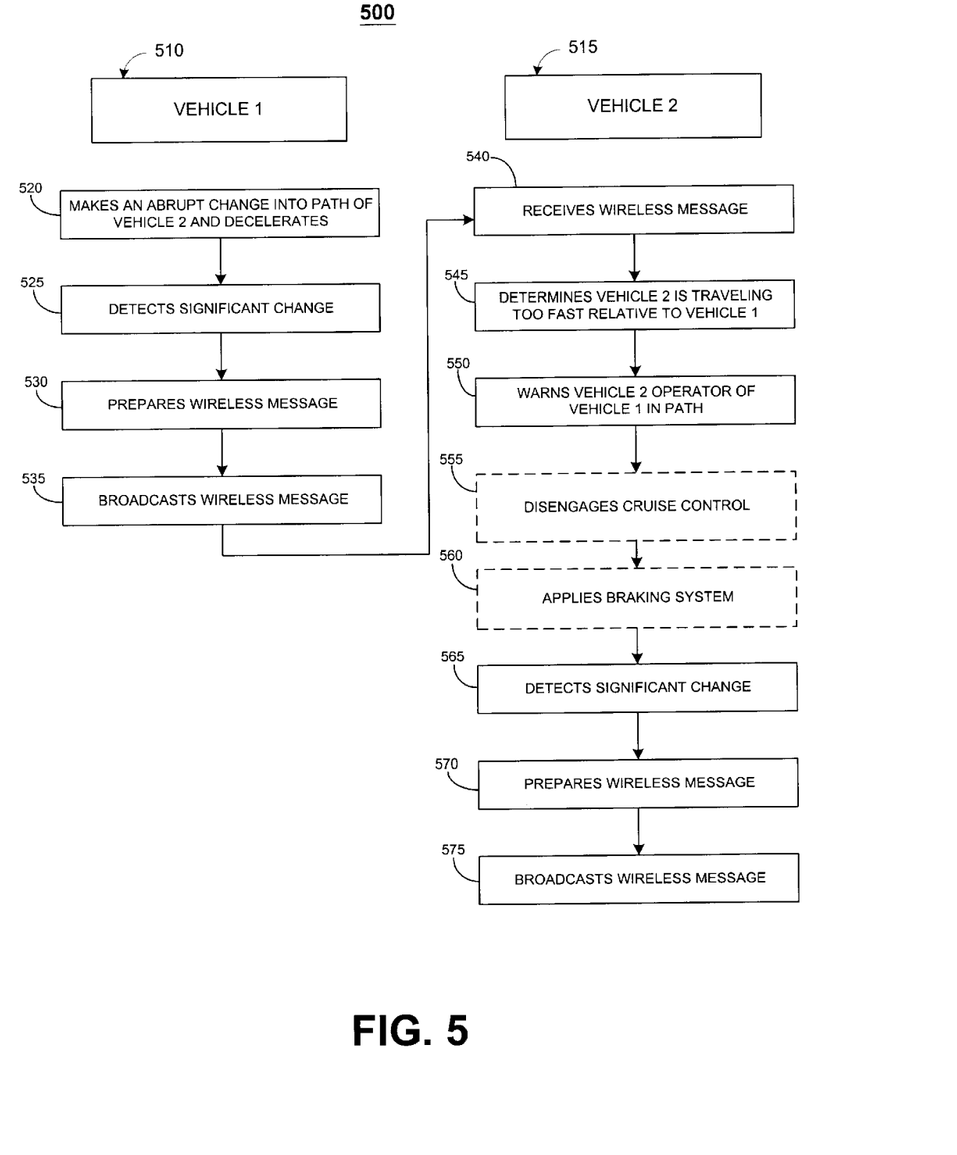
FIG. 5 is a block diagram illustrating communications between two vehicles equipped to exchange wireless communication messages.

FIG. 5 illustrates communications between two vehicles, vehicle 510 and vehicle 515, that are equipped to exchange wireless messages. Vehicle 510 makes an abrupt change into the path of vehicle 515 and decelerates rapidly (step 520). Vehicle 510 detects the significant change in direction and speed (step 525). Vehicle 510 prepares a wireless message (step 530). The wireless message includes the latitude and longitude of the vehicle 510 (position), the speed at which the vehicle 510 is traveling, the direction to which the vehicle 510 is traveling, and a text message that indicates that the vehicle 510 made an abrupt turn of a certain magnitude. Vehicle 510 broadcasts the prepared wireless message (step 535).

Vehicle 515 receives the wireless message broadcast from vehicle 510 (step 540). Vehicle 515 determines that vehicle 515 is traveling too fast relative to vehicle 510, which is directly ahead (step 545). Vehicle 515 warns the operator of vehicle 515 that vehicle 510 is in the path of vehicle 515 (step 550). Vehicle 515 may issue an audible warning, such as chiming a bell or playing a recorded message that indicates "vehicle in path; slow down." Vehicle 515 also may disengage cruise control (step 555) to release the throttle and help slow the vehicle 515 down. Vehicle 515 also may apply the braking system (step 560). In this implementation, vehicle 515 includes a drive-by-wire system in which the braking system is controlled by a processor. In some implementations, vehicle 515 may not be equipped with direct control of the cruise control system or the braking system.

Vehicle 515 detects a significant change in its speed (step 565) as the braking system is applied, either by the operator or a control system of vehicle 515. Vehicle 515 prepares a wireless message (step 570) that includes position information, direction information, and speed information. The information in the wireless communication message may be, for example, position information 220, direction information 230, speed information 240 in data structure 200 of FIG. 200. Vehicle 515 broadcasts the wireless message (step 575)

In some implementations, vehicle 515 may acknowledge receipt of wireless message sent by vehicle 510 in step 535 and/or vehicle 510 may acknowledge receipt of wireless message sent by vehicle 515 in step 575.

In some implementations, a combination of wireless communication between vehicles and the conventional cocoon approach may be beneficial. For example, when a substantial number of vehicles are not equipped with wireless communication systems capable of exchanging position and other information, a vehicle equipped with a wireless communication system may benefit from the use of conventional on-board cameras and radar systems to help avoid collisions and other accidents.

Implementations may include a method or process, an apparatus or system, or computer software on a computer medium. It will be understood that various modifications may be made. For example, the techniques described still could be used if steps of the disclosed techniques were performed in a different order and/or if components in the disclosed systems were combined in a different manner and/or replaced or supplemented by other components.

Other implementations are within the scope of the following claims.

What is claimed is:

1. A method for communicating position information between vehicles, the method comprising:
broadcasting from a first vehicle a message using a wireless communication pathway, the message describing a position of the first vehicle, a speed of the first vehicle, a direction in which the first vehicle is traveling and status information of the first vehicle wherein the status information indicates a status of a system in the first vehicle or indicates an abrupt change in speed or direction of the first vehicle;

receiving the message at a second vehicle;

determining a position of the second vehicle, a speed of the second vehicle, and a direction in which the second vehicle is traveling; and comparing the position of the first vehicle, the speed of the first vehicle, and the direction in which the first vehicle is traveling with the position of the second vehicle, the speed of the second vehicle, and the direction in which the second vehicle is traveling to determine whether an action is required by the second vehicle.

2. The method of claim 1 further comprising determining status information of the second vehicle.

3. The method of claim 2 further comprising comparing the position, speed, direction, and status information of the first vehicle with the position, speed, direction, and status information of the second vehicle to determine whether an action is required by the second vehicle.

4. The method of claim 1 further comprising generating one or more warnings to the operator of the second vehicle when an action is required.

5. The method of claim 4 wherein generating one or more warnings comprises generating one or more of an audible warning, a visual warning or a haptic warning.

6. The method of claim 1 further comprising controlling one or more components of the second vehicle when an action is required.

7. The method of claim 6 further comprising permitting user selection of components of the second vehicle that are controlled when an action is required.

8. The method of claim 6 wherein controlling one or more components of the second vehicle comprises controlling one or more of a cruise control system, a braking system, an anti-lock braking system, a traction control system, or a throttle.

9. The method of claim 1 further comprising detecting a significant change in the position of the first vehicle, the speed of the first vehicle, the direction in which the first vehicle is traveling, or a status of the first vehicle, wherein broadcasting the message from the first vehicle comprises broadcasting the message using the wireless communication pathway only when a significant change is detected in one or more of the position, speed, travel direction or status of the first vehicle.

10. The method of claim 1 wherein the status information of the first vehicle comprises a status indicating one or more of a deployment of one or more airbags, an application of traction control, a non-moving status of the first vehicle, an abrupt change of direction, rapid acceleration, or rapid deceleration.

11. A vehicle that processes position information received from other vehicles, the vehicle comprising a processor connected to a storage device and connected to one or more input/output devices, with the processor being configured to:

receive from a second vehicle a message sent using a wireless communication pathway, the message describing a position of the second vehicle, a speed of the second vehicle, a direction in which the second vehicle is traveling and status information of the first vehicle wherein the status information of the first vehicle indicates a status of a system in the first vehicle or indicates an abrupt change in speed or direction of the first vehicle;

determine a position of the vehicle, a speed of the vehicle, and a direction in which the vehicle is traveling; and compare the position, speed, and travel direction of the vehicle with the position, speed, and travel direction of the second vehicle to determine whether an action is required by the second vehicle.

12. The vehicle of claim 11 wherein the processor is further configured to determine status information of the vehicle.

13. The vehicle of claim 12 wherein the processor is further configured to compare the position, speed, travel direction, and status information of the vehicle with the position, speed, travel direction and status information of the second vehicle to determine whether an action is required by the vehicle.

14. The vehicle of claim 12 wherein the processor is further configured to generate one or more warnings to the operator of the vehicle based on the received message when an action is required.

15. The vehicle of claim 14 wherein the processor is configured to generate one or more of an audible warning, a visual warning or a haptic warning.

16. The vehicle of claim 11 wherein the processor is further configured to control one or more components of the vehicle when an action is required.

17. The vehicle of claim 16 wherein the processor is further configured to permit user selection of components of the vehicle that are controlled when an action is required.

18. The vehicle of claim 16 wherein the one or more components of the vehicle comprises a cruise control system, a braking system, anti-lock braking system, traction controls system, or a throttle.

19. The vehicle of claim 11 wherein the vehicle comprises an automobile, a truck, a train, or a bus.

20. The vehicle of claim 11 wherein the one or more input/output devices comprise one or more of a sound system speaker, a dashboard light, or a haptic control for a steering wheel which is capable of vibrating the steering wheel.

21. The vehicle of claim 11 wherein the status information of the first vehicle comprises a status indicating one or more of a deployment of one or more airbags, an application of traction control, a non-moving status of the first vehicle, an abrupt change of direction, rapid acceleration, or rapid deceleration.

22. A method for communicating position information between vehicles, the method comprising:

broadcasting from a first vehicle a message using a wireless communication pathway, the message describing a position of the first vehicle, a speed of the first vehicle, a direction in which the first vehicle is traveling, and a type of the first vehicle wherein the type of the first vehicle is an approaching emergency vehicle or a bus that is loading or unloading passengers;

receiving the message at a second vehicle;

determining a position of the second vehicle, a speed of the second vehicle, and a direction in which the second vehicle is traveling; and comparing the position of the first vehicle, the speed of the first vehicle, the direction in which the first vehicle is traveling, and the type of the first vehicle with the position of the second vehicle, the speed of the second vehicle, and the direction in which the second vehicle is traveling to determine whether an action is required by the second vehicle.

23. The method of claim 22 wherein the type of the first vehicle comprises a school bus that is loading or unloading school children.

24. The method of claim 22 further comprising generating one or more warnings to the operator of the second vehicle when the first vehicle is an emergency vehicle approaching the second vehicle.

25. The method of claim 22 further comprising generating one or more warnings to the operator of the second vehicle when the first vehicle is a bus that is unloading or unloading passengers, the bus is in a travel path of the second vehicle, and the second vehicle is approaching the bus.

26. A vehicle that processes position information received from other vehicles, the vehicle comprising a processor connected to a storage device and connected to one or more input/output devices, with the processor being configured to:

receive from a second vehicle a message sent using a wireless communication pathway, the message describing a position of the second vehicle, a speed of the second vehicle, a direction in which the second vehicle is traveling, and a type of the first vehicle wherein the type of the first vehicle is an approaching emergency vehicle or a bus that is loading or unloading passengers;

determine a position of the vehicle, a speed of the vehicle, and a direction in which the vehicle is traveling; and compare the position, speed, and travel direction of the vehicle with the position, speed, and travel direction of the second vehicle to determine whether an action is required by the vehicle.

27. The vehicle of claim 26 wherein the type of the first vehicle comprises a school bus that is loading or unloading school children.

28. The vehicle of claim 26 wherein the processor is further configured to generate one or more warnings to the operator of the second vehicle when the first vehicle is an emergency vehicle approaching the second vehicle.

29. The vehicle of claim 26 wherein the processor is further configured to generate one or more warnings to the operator of the second vehicle when the first vehicle is bus that is loading or unloading passengers, the bus is in travel path of the second vehicle, and the second vehicle is approaching the bus.

* * * * *

UNITED STATES PATENT AND TRADEMARK OFFICE
CERTIFICATE OF CORRECTION

PATENT NO. : 6,791,471 B2
DATED : September 14, 2004
INVENTOR(S) : Lawrence C. Wehner, Mary K. DePrez and Michael A. Crowder It is certified that error appears in the above-identified patent and that said Letters Patent is hereby corrected as shown below:

Title page,
Item [73], Assignee, change "Electric Data Systems" to -- Electronic Data Systems Corporation --.

Signed and Sealed this

Ninth Day of November, 2004

JON W. DUDAS
*Director of the United States Patent and Trademark Office*